Patented Apr. 24, 1945

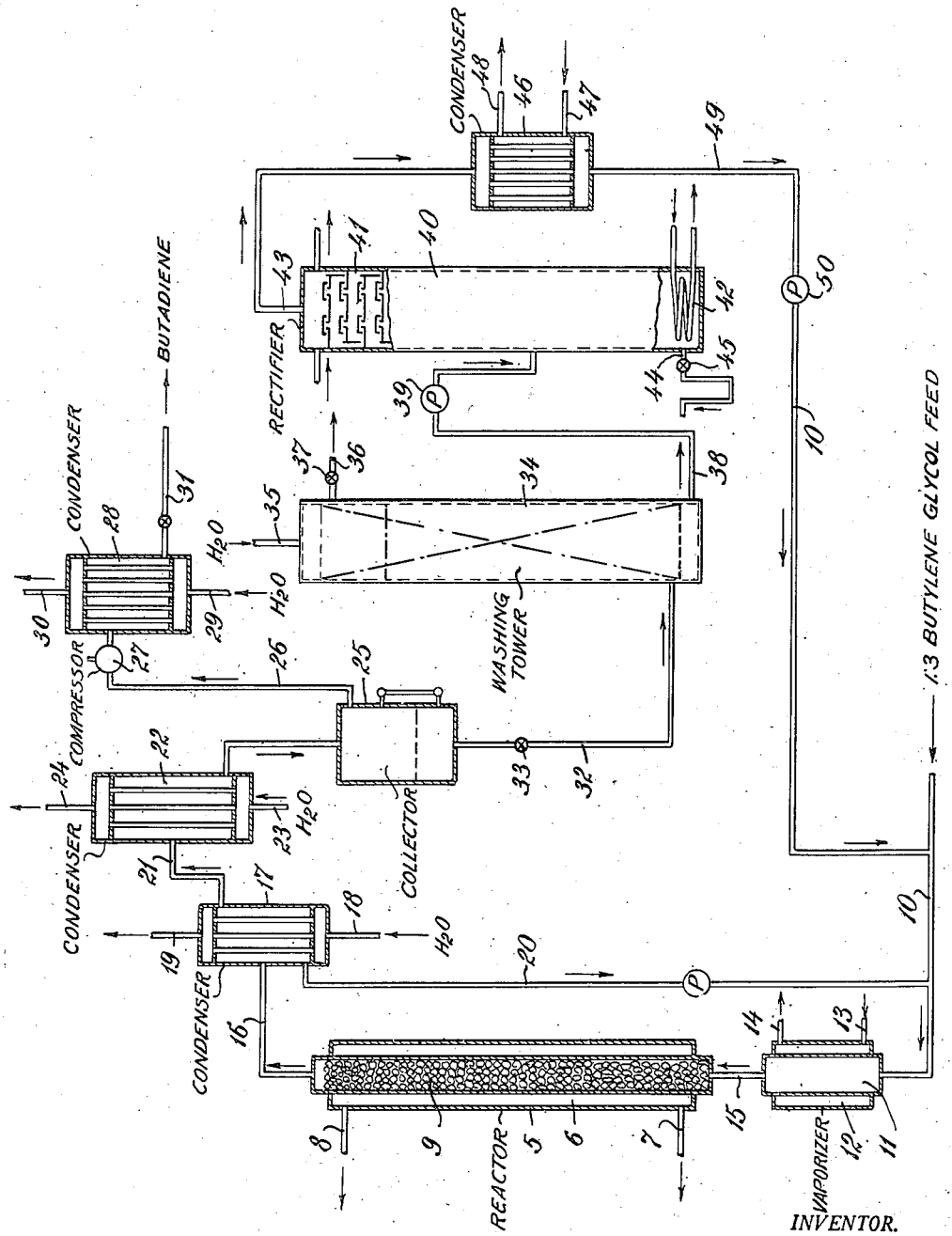

2,374,253

UNITED STATES PATENT OFFICE 2,374,253

PRODUCTION OF BUTADIENE

Clayton S. Wynn, Darien, Conn., assignor to Air Reduction Company, Incorporated, New York, N. Y., a corporation of New York Application July 29, 1943, Serial No. 496,556

1 Claim. (Cl. 260—681)

This invention relates to the production of 1,3-butadiene from 1,3-butylene glycol and particularly to improvements in the recovery and utilization of partially reacted glycol or butenol from the condensate after separation of butadiene.

1,3-butadiene is derived from 1,3-butylene glycol by splitting off water in accordance with the following reaction:

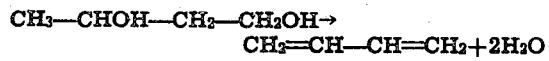

$$CH_3-CHOH-CH_2-CH_2OH \rightarrow CH_2=CH-CH=CH_2 + 2H_2O$$

Arthur E. Lorch, in application Serial No. 477,939, filed March 4, 1943, has described a method of producing butadiene by contacting glycol with a catalyst suspended or dissolved in a suitable liquid carrier at an elevated temperature. In a second application, Serial No. 483,343, filed April 16, 1943, Arthur E. Lorch has disclosed a procedure for effecting the dehydration of glycol in the vapor phase to produce butadiene. In both of the procedures described in the applications mentioned, vapor including butadiene and other products is removed from the reactor. Upon condensation, butadiene is withdrawn as a vapor. The condensate includes a considerable quantity of partially reacted glycol or butenol. It is, however, contaminated by materials, of an oily character and undetermined composition, which if returned to the catalyst may cause rapid deterioration and loss of activity.

It is the object of the present invention to provide a simple and satisfactory procedure whereby the contaminating materials may be separated readily from the butenol which is recovered for further use in the reaction.

Other objects and advantages of the invention will be apparent as it is better understood by reference to the following specification and the accompanying drawing, which illustrates diagrammatically an apparatus suitable for the practice of the invention.

For the purpose of describing the invention, reference will be made to the details of the procedure involved in the vapor phase dehydration of 1,3-butylene glycol. It is to be understood, however, that the invention of the present application is equally applicable to the recovery of butenol formed as a result of reaction of 1,3-butylene glycol in the presence of a catalyst suspended or dissolved in a suitable liquid, as described in the earlier of the Lorch applications.

Butadiene can be produced advantageously by passing 1,3-butylene glycol in the vapor phase over a catalyst mass which is adapted to withstand the disintegrating effect of free phosphoric acid. The catalyst mass is maintained preferably at a temperature ranging from 220° to 400° C., the most effective range for the catalyst hereinafter described being approximately 280° to 320° C. The temperature may be maintained by circulating a suitable heating medium such, for example, as a mixture of diphenyl and diphenyl oxide known as "Dowtherm" about the catalyst body.

As the catalyst, I prefer to employ "ammonium phosphate." The term "ammonium phosphate" is employed as a general designation of the tri, di and mono ammonium phosphates or mixtures of these salts. It is employed also to include decomposition products of these phosphates which are subject to modification when subjected to temperatures such as those employed in the method. The precise composition of the resultant salt or salts in the catalyst mass at the temperature maintained cannot be determined accurately. Any of the phosphates mentioned or the resulting products are active catalysts for the reaction. "Ammonium phosphate" is markedly superior to the phosphate catalysts which have been mentioned in the literature concerning dehydration of 1,3-butylene glycol.

In order to attain the most effective use of "ammonium phosphate" as a catalyst for the reaction, it is desirable to mount it on a suitable support. Most of the supports commonly suggested for use in the preparation of catalyst bodies are useless for the purpose of the present invention because they do not withstand the disintegrating effect of free phosphoric acid which is inevitably present at the temperature employed. Silica affords a satisfactory support for "ammonium phosphate" in catalyst masses to be employed for the purpose of the present invention. The preferred forms of silica are a calcined diatomaceous earth consisting essentially of silica and generally known as "Celite V." Another type of support is silica bonded with feldspar. Any relatively pure silica may be fritted with the addition of feldspar to produce a material adapted for use as a support which effectively withstands the disintegrating effect of phosphoric acid.

The catalyst mass may be prepared in any suitable manner. For example, the selected supporting material may be soaked in a solution of "ammonium phosphate." The excess liquid may be drained away and the wetted support may then be dried. Alternatively a solution of "ammonium phosphate" may be added to the supporting material and the mass may be dried while it is stirred to maintain uniformity. Whatever procedure is adopted, the supporting material carrying the "ammonium phosphate" may be formed into pellets in accordance with the usual method. The pellets may be of any desired size adapted to afford maximum surface contact with the necessary interstices through which the vapor may readily pass.

The proportion of the "ammonium phosphate" in the catalyst mass may be varied over wide limits. It will depend in part upon the degree and type of porosity of the supporting material as well as the size of the pieces. Satisfactory catalysts have been prepared covering the range of 10% to 60% "ammonium phosphate." The size of the individual pieces of catalyst can be varied within wide limits to secure the optimum contact with the reactant gases.

As the result of dehydration of the 1,3-butylene glycol, butadiene is produced admixed with unreacted and partially reacted glycol. By passing the vapors through a suitable condenser at about 100° C., the unreacted glycol can be liquefied, separated and returned for further treatment. The partially reacted glycol or butenol with water and the butadiene pass the condenser. These vapors are then subjected to further cooling in a second condenser and the butadiene is separated as a vapor. It may be compressed and condensed by cooling to a liquid, or it may be withdrawn and stored in the form of vapor.

The partially reacted glycol or butenol and water resulting from the reaction, together with some contaminating compounds, are condensed to a liquid. The contaminating compounds are insoluble in water, whereas the butenol is soluble. To recover the butenol, the condensate is washed with water. The oily residue which rises to the top of the washing tower is withdrawn and discarded. The water soluble butenol dissolved in the wash water is then subjected to distillation to separate an azeotrope of butenol and water. The azeotrope may be condensed and returned for further dehydration and contact with the catalyst. The separated water is withdrawn and discharged from the bottom of the rectifier.

The procedure will be readily understood by reference to the drawing, the apparatus being merely illustrative of suitable equipment for the purpose. The reactor 5 may be a tubular chamber of suitable material surrounded by heating jackets 6 to which the heating fluid is introduced through a pipe 7 and withdrawn through a pipe 8. The catalyst 9 is disposed within the chamber 5 in the form of pellets of suitable size to effect the desired result.

1,3-butylene glycol is supplied through a pipe 10 to a vaporizer 11 which may be heated, for example, by the passage of a suitable liquid such as "Dowtherm" through a jacket 12. The heating liquid is introduced through a pipe 13 and withdrawn through a pipe 14. The glycol is thus vaporized and delivered to the reactor 5 by a pipe 15.

The gaseous products of the reaction are withdrawn through a pipe 16 and delivered by a condenser 17 supplied with a cooling liquid such as water through a pipe 18. The water escapes through a pipe 19. The condensate, consisting of unreacted glycol, is delivered by a pipe 20 to the pipe 10 and vaporizer 11.

The remaining vapors are delivered by a pipe 21 to a condenser 22 through which a cooling liquid such as water is circulated by pipes 23 and 24. The condensate is delivered to a collector 25. Butadiene escapes through a pipe 26 and is preferably compressed by a compressor 27 before it enters a condenser 28. Cooling water may be introduced through a pipe 29 and withdrawn through a pipe 30. The butadiene in the liquid phase may be withdrawn through a pipe 31 and delivered to a suitable storage receptacle.

The condensate in the collector 25 is delivered through a pipe 32 controlled by a valve 33 to a washing tower 34 which may be filled with any suitable packing material such as rings or other devices to facilitate contact between the condensate rising through the tower and water which is introduced at the top through a pipe 35. As a result of the washing action, the water soluble butenol is separated from the condensate. An oily layer including contaminating compounds rises to the top and is withdrawn through a pipe 36 controlled by a valve 37.

The wash water, with the dissolved butenol, escapes through a pipe 38 and is delivered by a pump 39 to a rectifier 40 which may be provided with the usual bubble caps 41 or other means for facilitating contact between the liquid and vapors in the rectifier 40. The rectifier is heated at the bottom by means of a steam coil 42. The resulting vapors rising through the rectifier form an azeotrope of butenol and water which escapes at the top through a pipe 43. Water may be withdrawn from the bottom of the rectifier through a pipe 44 controlled by a valve 45.

The azeotrope of butenol is delivered by the pipe 43 to a condenser 46 which may be cooled with water introduced through the pipe 47 and withdrawn through the pipe 48. The condensed azeotrope is delivered through a pipe 49 and pump 50 to the pipe 10 and is thus returned for vaporization and introduction with the glycol to the reactor 5.

The partially reacted glycol or butenol is thus freed from impurities which, if retained, might affect the catalyst or otherwise interfere with the dehydration reaction. Butenol is readily dehydrated in contact with the catalyst to produce butadiene. Hence the efficiency of the operation is improved by the procedure hereinbefore described.

Various changes may be made in the apparatus employed and in the details of the procedure without departing from the invention or sacrificing the advantages thereof.

I claim:

The method of dehydrating 1,3-butylene glycol to produce 1,3-butadiene which comprises contacting the glycol with a heated dehydration catalyst, condensing and returning the unreacted glycol vapor to the dehydration catalyst, condensing the remaining vapors other than butadiene, withdrawing the butadiene vapors, washing the condensed remaining vapors with water, discarding the water insoluble product, rectifying the water soluble constituents to recover an azeotrope of butenol and water, and returning the azeotrope to the dehydration catalyst.

CLAYTON S. WYNN.